(12) United States Patent
Ng et al.

(10) Patent No.: US 7,363,098 B2
(45) Date of Patent: Apr. 22, 2008

(54) METHOD TO IDENTIFY MACHINES CAUSING EXCURSION IN SEMICONDUCTOR MANUFACTURING

(75) Inventors: Choy Yow Ng, Singapore (SG); Ying Li Fan, Singapore (SG)

(73) Assignee: TECH Semiconductor Singapore Pte Ltd, Singapore (SG)

( * ) Notice: Subject to any disclaimer, the term of this patent is extended or adjusted under 35 U.S.C. 154(b) by 225 days.

(21) Appl. No.: 11/311,120

(22) Filed: Dec. 19, 2005

(65) Prior Publication Data

US 2007/0142951 A1 Jun. 21, 2007

(51) Int. Cl.
*G06F 19/00* (2006.01)
(52) U.S. Cl. .................. 700/110; 700/108; 700/121
(58) Field of Classification Search .................. 700/95, 700/108, 109, 110, 111, 117, 121, 174, 175; 716/2, 3, 4; 438/10, 11, 14–18; 702/35, 702/81–84, 182–185
See application file for complete search history.

(56) References Cited

U.S. PATENT DOCUMENTS

| | | | |
|---|---|---|---|
| 5,665,609 A | 9/1997 | Mori | 438/16 |
| 5,991,699 A | 11/1999 | Kulkarni et al. | 702/83 |
| 6,459,949 B1 * | 10/2002 | Black et al. | 700/121 |
| 6,470,229 B1 | 10/2002 | Wang et al. | 700/121 |
| 6,580,960 B1 * | 6/2003 | Nicholson | 700/121 |
| 6,701,204 B1 * | 3/2004 | Nicholson | 700/121 |
| 6,826,735 B2 | 11/2004 | Ono et al. | 716/4 |
| 6,885,950 B2 | 4/2005 | Mitsutake et al. | 702/58 |
| 6,901,340 B1 | 5/2005 | Pasadyn et al. | 702/84 |
| 6,944,561 B2 | 9/2005 | Tseng et al. | 702/84 |
| 7,065,425 B1 * | 6/2006 | Kay et al. | 700/121 |
| 7,197,414 B2 * | 3/2007 | Matsushita et al. | 700/121 |

* cited by examiner

*Primary Examiner*—Leo Picard
*Assistant Examiner*—Charles Kasenge
(74) *Attorney, Agent, or Firm*—Saile Ackerman LLC; Stephen B. Ackerman; Rosemary L. S. Pike

(57) ABSTRACT

The present invention discloses a method that recognizes and uses the grouping patterns of process material by different machines at different process steps to identify potential problem machines causing the excursion in semiconductor manufacturing. The excursion could be a yield problem at the final test or at any inline electrical testing, metrology measurement, or inspection at different process steps. The potential problematic machines are listed in order of most likely to be problematic.

29 Claims, 5 Drawing Sheets

Legend: "X" bad wafer lot; "O" good wafer lot

Legend: "X" bad wafer lot; "O" good wafer lot

METHOD TO IDENTIFY MACHINES CAUSING EXCURSION IN SEMICONDUCTOR MANUFACTURING

BACKGROUND OF THE INVENTION (1) Field of the Invention

This invention discloses a method to identify problem machines causing excursion in semiconductor manufacturing, and, more particularly, a method that recognizes and uses a process material's grouping patterns to distinguish the machines that are most probably faulty for excursion analysis in semiconductor manufacturing.

(2) Description of the Related Art

In semiconductor manufacturing, an excursion is a departure from the expected result of a particular process step. The majority of excursions are machine-related. The ability to identify problem machines accurately during excursion is important such that these machines can be stopped in a timely manner to contain further propagation of the problem. Wafer lots process through hundreds of processing steps in a wafer fab. Each process step may comprise more than one machine and some machines may be used for multiple processing steps. The huge number of process steps and combinations of machines makes the identification of the problem machine a challenging task.

The most common method for identification of faulty machines in a wafer fab is the well-known ANOVA test. To ensure minimum accuracy of this method, data from a large quantity of excursion material must be collected. This is because this method requires a large amount of data to determine the statistical difference between machines. Another commercially available excursion analysis tool is Yield Mine. This tool also needs a great deal of data to generate reasonable decision tree results as disclosed in U.S. Pat. No. 6,470,229 to Wang et al. Since all wafer fabs strive to start the excursion analysis at the earliest time possible, there is a need for a method that is able to identify problem machines based on a minimum number of wafer lots so as to speed up the excursion analysis.

Prior art patent documents U.S. Pat. No. 6,901,340 to Pasadyn et al, U.S. Pat. No. 6,701,204 to Nicholson, U.S. Pat. No. 6,580,960 to Nicholson, U.S. Pat. No. 6,944,561 to Tseng et al, U.S. Pat. No. 6,885,950 to Mitsutake et al, U.S. Pat. No. 6,826,735 to Ono et al, U.S. Pat. No. 5,991,699 to Kulkarmi et al, and U.S. Pat. No. 5,665,609 to Mori relate to methods for detection of defects for improvement of production yield. Among these prior art, U.S. Pat. Nos. 6,901,340, 6,701,204 and 6,580,960 appear to be closely related to the present invention. U.S. Pat. No. 6,901,340 to Pasadyn et al discloses a method for distinguishing between sources of process variation. This method employs a characteristic thread matrix derived from process parameters such as film thickness and critical dimensions for differentiating the sources of process variation. U.S. Pat. Nos. 6,701,204 and 6,580,960, both to Nicholson, relate to a method for finding an operation and tool combination that causes integrated failure in semiconductor manufacturing. This method involves calculating the cumulative value of bad wafer lots for each tool and the tool with largest maximum cumulative value is most likely to be defective.

None of these prior art documents appear to show a method that is able to identify machines based on their grouping patterns with a minimum of two processed wafer lots.

SUMMARY OF THE INVENTION

It is the primary objective of the present invention to identify problem machines in a semiconductor manufacturing fab.

Another objective of the present invention is to identify problem machines in a semiconductor manufacturing fab using a minimum number of wafers or wafer lots.

Yet another objective is to identify possible problem machines based on process steps and sort them in order of most likely to be problematic.

In accordance with the objectives of the invention, there is disclosed a method that recognizes and uses the grouping patterns of process material by different machines at different process steps to identify potential problem machines causing the excursion in semiconductor manufacturing. The excursion could be a yield problem at the final test or at any inline electrical testing, metrology measurement, or inspection at different process steps.

The method comprises the following steps:

i) To identify machines that produce bad wafer lots.

ii) To single out the machines that produce all bad wafer lots for each of the processes determined in step (i).

iii) To compute the time delta between first bad wafer lot and last bad wafer lot for machines identified in step (ii).

iv) To work out a cut-off value derived from the time delta obtained in step (iii).

v) To compute the number of good wafer lots processed between the first bad wafer lot and the last bad wafer lot for machines identified in step (ii).

vi) To work out a cut-off value derived from the number of good wafer lots obtained in step (v).

vii) To remove machines from the list of machines singled out in step (ii) using the cut-off points derived in steps (iv) and (vi).

viii) To compute the ratio of number of bad wafer lots to the total number of wafer lots produced by machines left over from step (vii).

ix) To sort and display the list of machines left over from step (vii) according to the ratio computed in step (viii), time delta from step (iii) or number of good wafer lots from step (v) in ascending or descending order.

x) To commence yield excursion analysis on machines according to the displayed order.

Also in accordance with the objectives of the invention, a manufacturing system is disclosed comprising a plurality of machines for processing a plurality of manufactured items through a series of processes, a database server adapted to store a set of data associated with the manufactured items, an excursion monitor adapted to identify manufactured items having an excursion from a desired process result, and a problematic machine identifier for identifying and listing problematic machines in order of most likely to be causing the excursion.

DETAILED DESCRIPTION OF THE INVENTION

Figure 1:
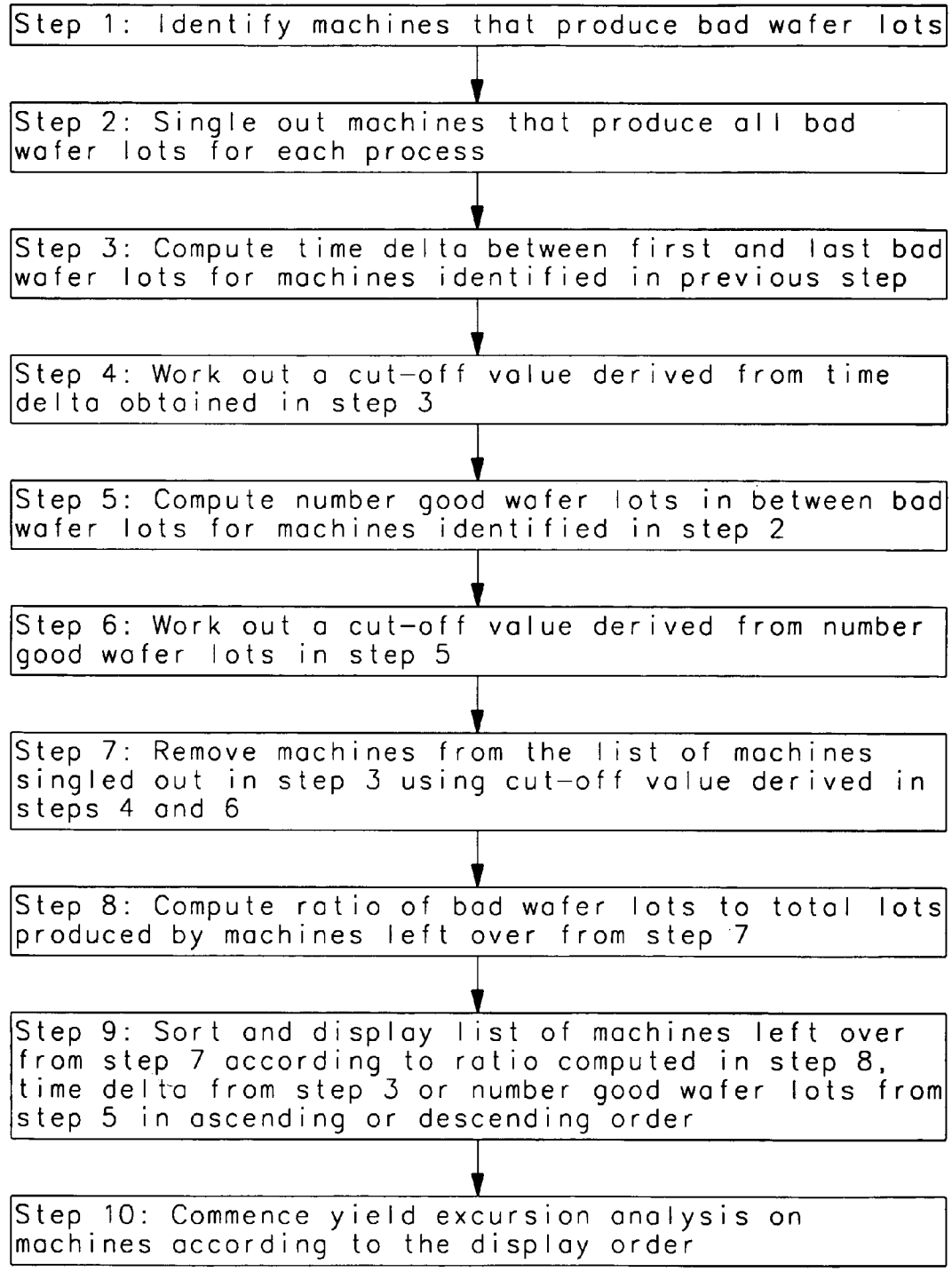
FIG. 1 shows a flowchart of the method of the present invention.

In semiconductor manufacturing, process variation can be caused by many factors. Machines' performance drift over time is one of the factors. The present invention discloses a method to identify problem machines using a minimum number of wafer lots so as to speed up the excursion analysis. FIG. 1 illustrates the overview of the method. The present invention discloses a method that recognizes and uses the grouping patterns of process material by different machines at different process steps to identify potential problem machines causing excursion in semiconductor manufacturing. The excursion could be a yield problem at the final test or at any inline electrical testing, metrology measurement, or inspection at different process steps.

The process of the invention begins after detecting at least two problem wafers or two problem lots of wafers through a series of manufacturing process steps on a plurality of machines. The wafers are tested at final test or at any conventional in-line testing position at different process steps. Data is stored for each of the wafers and compared to desired parameters in order to identify "bad" wafers.

Step 1: Identify Machines that Produce Bad Wafer Lots.

Figure 2:
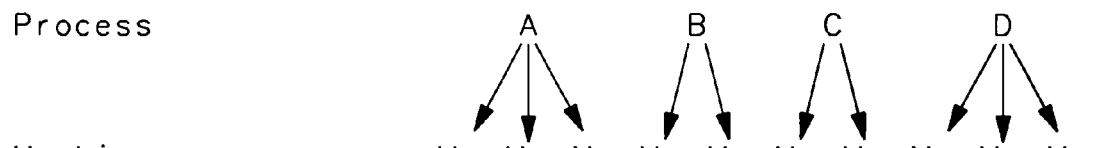
FIG. 2 shows an example of step 1 of the present invention.

In a practical volume production line, there are many processes and each process can run on many different machines. This step identifies all machines that produce the excursion wafer lots, or bad wafer lots, from each of the process steps. For example, as illustrated in FIG. 2, there are four processes, namely process A, B, C and D. For process A, one machine $M_{A2}$ produces all bad wafer lots. For process B, two machines $M_{B1}$ and $M_{B2}$ produce all bad wafer lots. For process C, one machine $M_{C1}$ produces all bad wafer lots. Finally, for process D, one machine $M_{D3}$ produces all bad wafer lots. Machines $M_{A2}$, $M_{B1}$, $M_{B2}$, $M_{C1}$ and $M_{D3}$ are identified as potential problem machines.

Step 2: Single Out the Machines that Produce all Bad Wafers Lots for Each of the Processes Determined in Step 1.

Since it is highly improbable for more than one machine to drift at the same time, this step eliminates all processes with more than one machine identified to narrow down the scope of investigation. Referring to FIG. 2, the bad wafer lots from process B come from both machines $M_{B1}$ and $M_{B2}$; hence machines for process B can be eliminated. On the other hand, all bad wafer lots in processes A, C and D come from single machines $M_{A2}$, $M_{C1}$ and $M_{D3}$ respectively. Hence, $M_{A2}$, $M_{C1}$ and $M_{D3}$ are singled out.

Step 3: Compute the Time Delta Between the First Bad Wafer Lot and Last Bad Wafer Lot Occurring for Machines Identified in Step 2.

In semiconductor manufacturing processes, wafer lots rarely follow a First in First out (FIFO) sequence. This is due to interruptions in the manufacturing process caused by engineering work, metrology sampling, material holding, special work requests, and machine maintenance. When there is an undetected machine problem, it will affect all wafer lots processed by that machine. These affected lots will cluster together at the problem machine's process step and disperse out as they move away to other process steps. In this step, the time delta between the first bad wafer lot and the last bad wafer lot are computed for machines that are singled out in Step 2.

Figure 3:
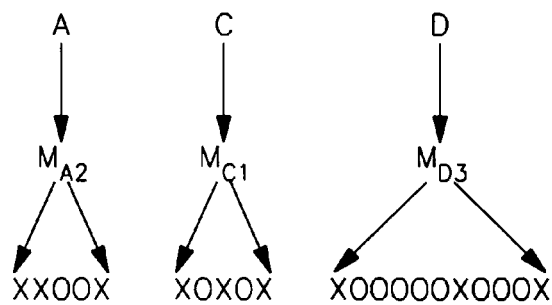
FIG. 3 shows an example of step 3 and step 5 of the present invention.

Illustrated in FIG. 3 are machines $M_{A2}$, $M_{C1}$ and $M_{D3}$ at processes A, C and D which are left over from Steps 1 and 2. The excursion wafer lots from $M_{A2}$, $M_{C1}$, and $M_{D3}$ occur within 3, 1, and 7 days respectively. If excursion wafer lots occur frequently across a short time frame for a particular process, the probability of the process related to the excursion is high. Since all the excursion wafer lots from $M_{C1}$ occur on the same day, $M_{C1}$ could be the problematic machine.

Step 4: Work Out a Cut-Off Point Derived from the Time Delta Obtained in Step 3.

Figure 4:
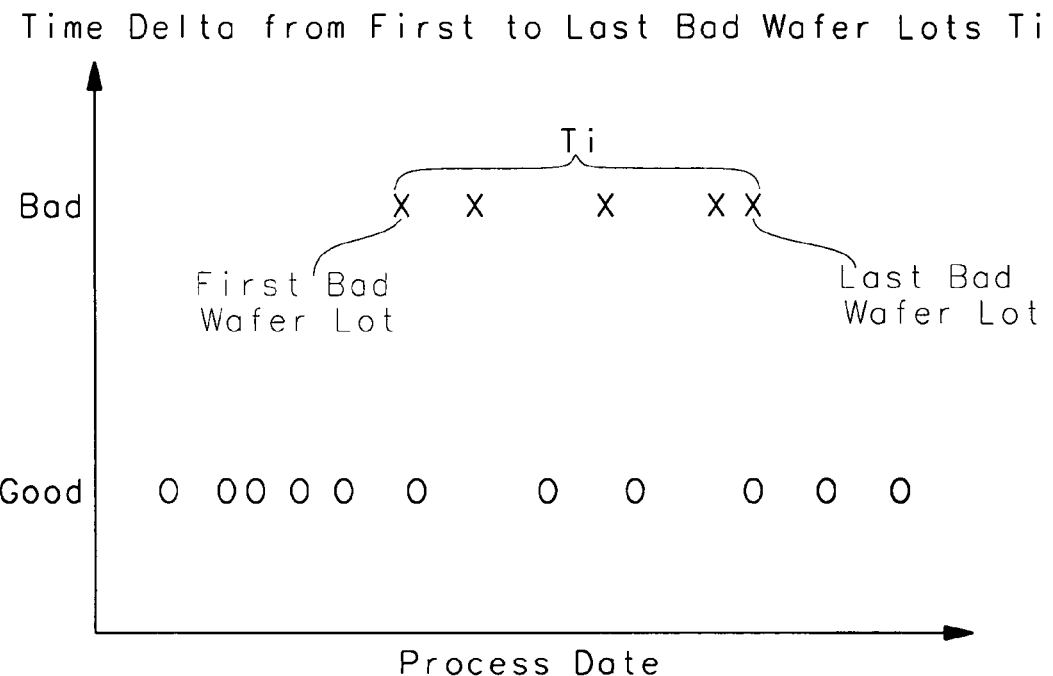
FIGS. 4 through 6 show an example of step 4 of the present invention.

Referring to FIG. 4, 'time delta in between bad wafer lots', Ti refers to the time delta from the first bad wafer lot appearance to the last bad wafer lot. The smaller value of Ti translates to bad wafer lots processed near each other within a short time frame. Likewise, a higher value of Ti means bad wafer lots processed far from each other or implies that the process step is further steps away from the problematic step due to dispersion phenomena.

Figure 5A:
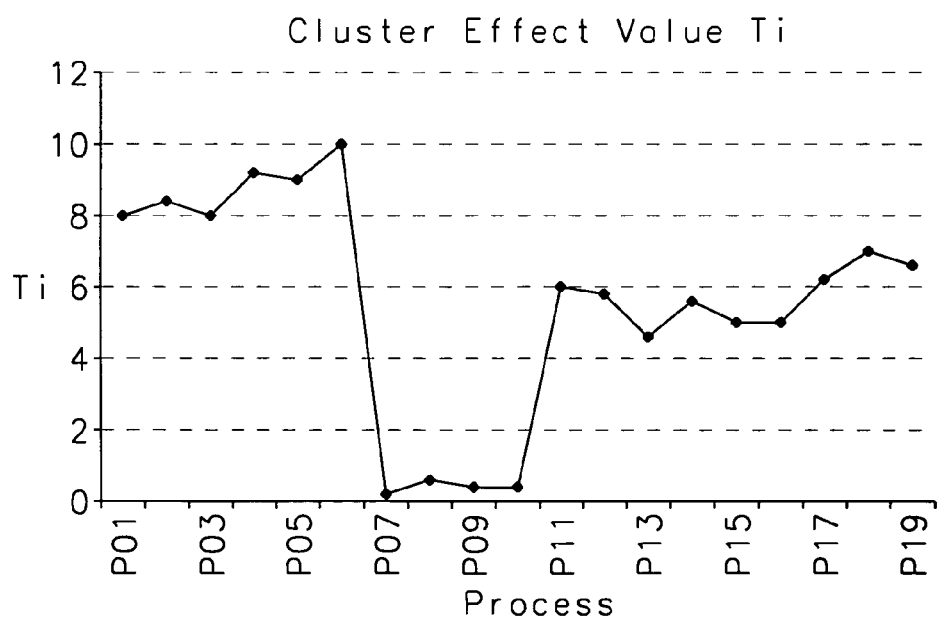
Figure 5B:
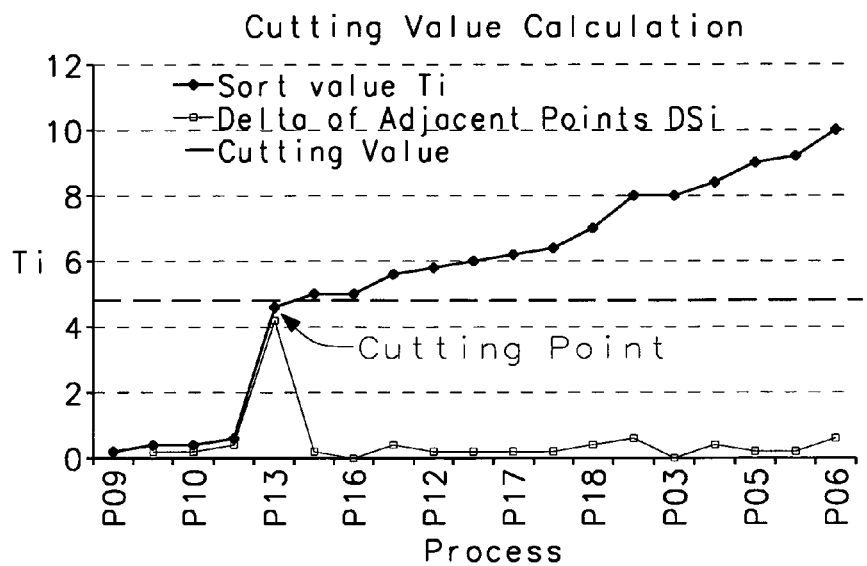
Figure 6:
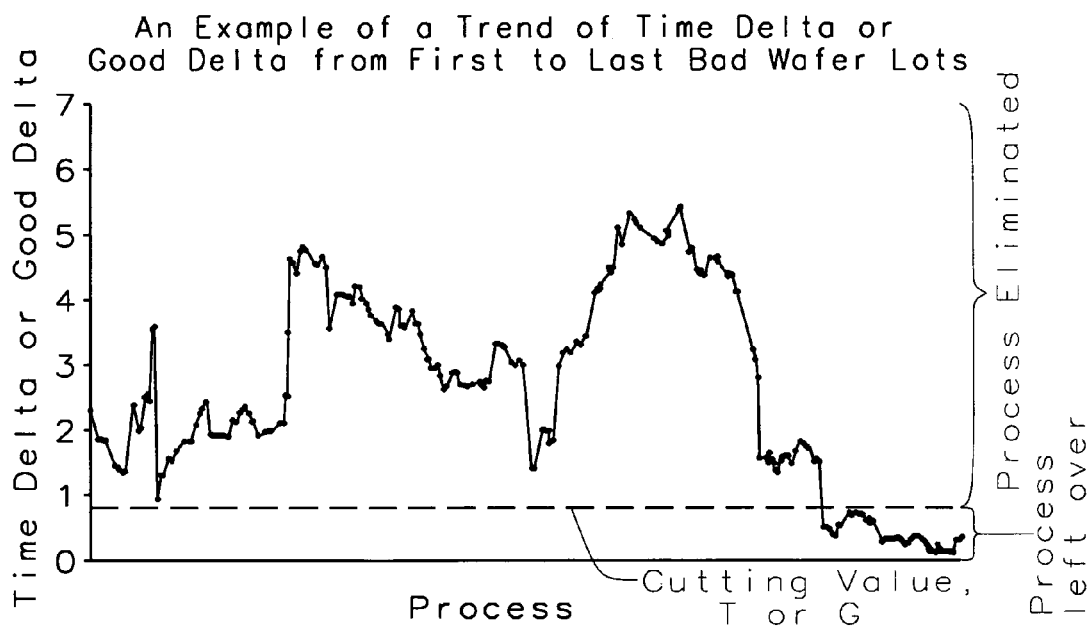

FIG. 5 illustrates how to determine a T cutting value for process elimination. Let i represent each process step. Ti is computed for each process step, as shown in FIG. 5A, and sorted in ascending order, as shown in FIG. 5B. A delta slope, DSi is calculated based on differences between Ti and Ti+1. The cutting point is set at the maximum DSi. This will be the T cutting value. If there is no obvious maximum DSi, the T cutting value can be set to a certain percentile of Ti. FIG. 6 shows an example of a T cutting value used for process elimination.

Step 5: Compute the Number of Good Wafer Lots Between the First Bad Wafer Lot and the Last Bad Wafer Lot Occurring for Machines Identified in Step 2.

Figure 7:
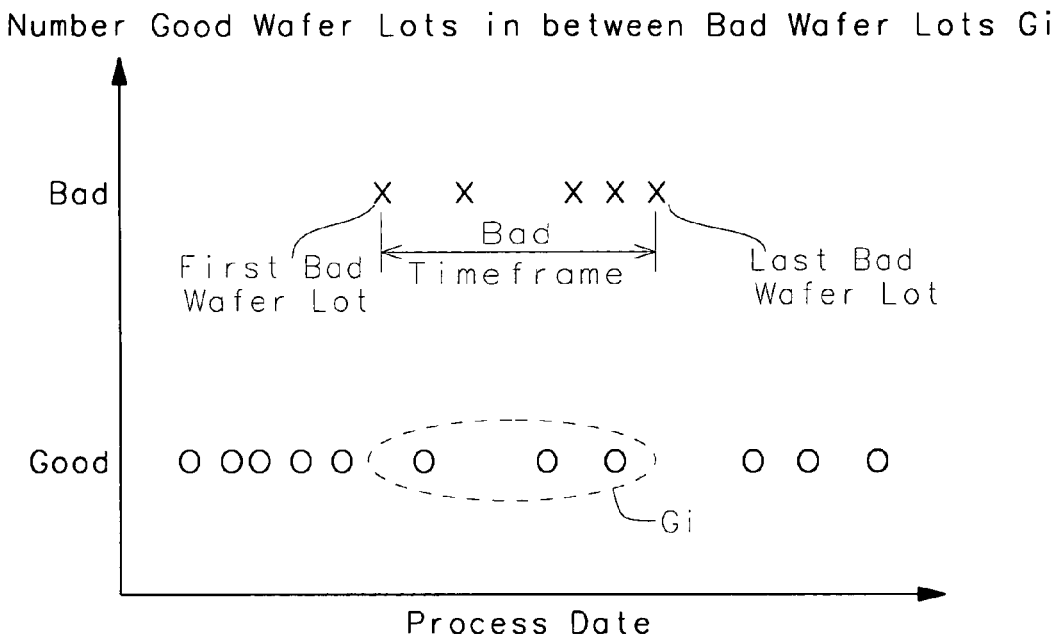
FIG. 7 shows an example of step 5 of the present invention.

Similarly, if there are no or not many good wafer lots between bad wafer lots, then the probability of the process' being related to the excursion is high. As illustrated in FIG. 7, the number of good wafer lots in between bad wafer lots Gi is computed for each process step.

Step 6: Work Out a Cut-Off Point Derived from the Number of Good Wafer Lots Obtained in Step 5.

This is the same as step 4. Instead of delta time, calculate a good delta, the number of good wafer lots between the first and last bad wafer lots Gi for each process step i. Then, sort the calculated Gi values in ascending order. A delta slope, DSi is calculated based on differences between Gi and Gi+1. The cutting point is set at the maximum DSi. This will be the G cutting value. If there is no obvious maximum DSi, the G cutting value can be set to a certain percentile of Gi. FIG. 6 shows an example of a G cutting value used for process elimination.

Step 7: Remove Machines from the List of Machines Singled Out in Step 2 Using the Cut-Off Points Derived in Steps 4 and 6.

The list of machines singled out in step 2 is further filtered by removing all machines with delta time or number of good wafer lots higher than the cut off value determined in steps 4 and 6 respectively. This means, machines are eliminated for having higher than either one of the two cut off values. In the illustrated example, machine $M_{D3}$ is eliminated from the list.

Step 8: Compute the Ratio of the Number of Excursion Wafer Lots to the Total Number of Wafer Lots Produced by the Machines in the List after Step 7.

Figure 8:
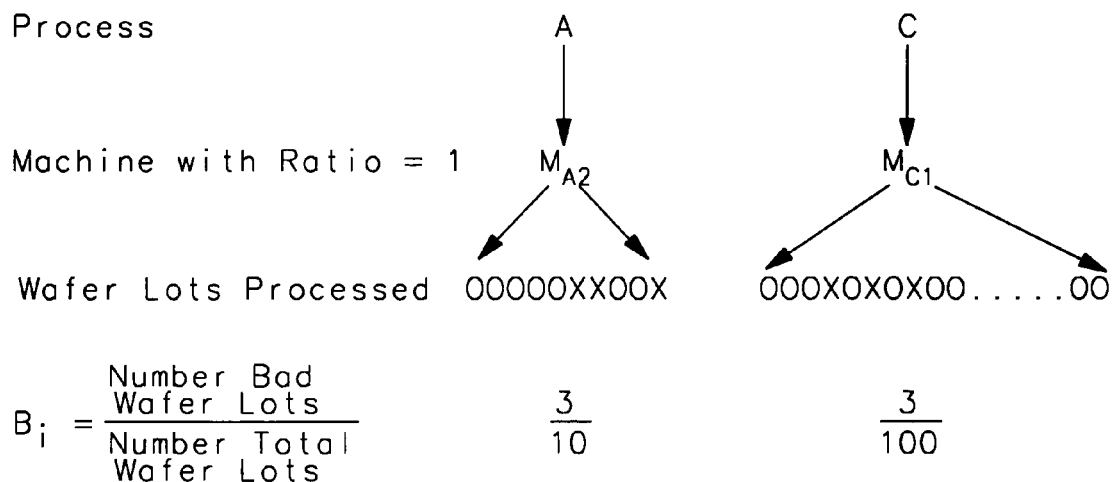
FIG. 8 shows an example of step 8 of the present invention.

After Steps 1 to 7, the number of potential problematic machines is dramatically reduced. The ratios of excursion wafer lots to total wafer lots processed through the machines left over from step 7 are calculated for each machine. According to FIG. 8, 3 out of 10 wafer lots are bad wafer lots from $M_{A2}$, while 3 out of 100 wafer lots are bad wafer lots from $M_{C1}$. $M_{A2}$ has a higher probability of being the problematic machine causing the excursion. In this step, $B_i$ the ratio of the number of excursion wafer lots to the total number of wafer lots produced by the machines is computed.

Step 9: Sort and Display the List of Machines Left Over from Step 7 According to the Ratio Computed in Step 8, Time Delta from Step 3 or Number of Good Wafer Lots from Step 5 in Ascending or Descending Order.

The ratio $B_i$ computed in step 8 is used to sort the remaining machines from step 7 for process steps with multiple machines. The ratio can be sorted in either ascending or descending order. The machines displayed on the top or bottom of the list are the most probable problematic machines depending on the order in which they are arranged. For process steps using a single machine, the remaining machines from step 7 will be sorted using time delta calculated in step 3 or number of good wafer lots derived in step 5. Machines with a lower time delta or a lower number of good wafer lots have higher probability of being the problem machine causing the excursion. Two lists of possible problematic machines result from this step—one, list for process steps using multiple machines and one list for process steps using a single machine.

Step 10: Commence Yield Excursion Analysis on Machines According to the Displayed Order.

Now, process engineers can perform yield analysis on the machines on the list. Most likely problematic machines can be checked first.

6. Advantages of the Invention

This invention is very efficient and effective for excursion analysis. It can identify a problem machine at the process causing the excursion even after only two problem wafer lots are detected, while other methods require many problem wafer lots to be detected. Since the problem machine can be detected earlier, we can minimize excursion impact to the production by stopping and fixing the problem machine much sooner. This invention sorts the most probable problem machine and process to the top or bottom of a displayed list for investigation to speed up engineering trouble-shooting. This invention also works very well for manufacturing processes with long, complicated process steps and machine combinations.

7. Alternative Examples of the Invention

The sequence of steps 2 to 7 is not fixed. The invention can be used for identification of machines causing excursions or abnormalities detected at any process steps such as metrology measurements, electrical characterization, visual inspection, and final test. In addition, wafer level data instead of lot level data can be used to determine the problematic machine using the present invention.

In addition to semiconductor manufacturing, this invention also can be used by other manufacturing industries.

Data can be stored for each manufactured item (for example, for each wafer lot or for each wafer) in a database system, for example. An excursion monitor, for example, can compare the data stored in the database system to desired parameters in order to identify manufactured items that exhibit an excursion from a desired parameter value. A problematic machine identifier, for example, can perform any or all of steps 2-9 to generate the ordered list of problematic machines.

Although the preferred embodiment of the present invention has been illustrated, and that form has been described in detail, it will be readily understood by those skilled in the art that various modifications may be made therein without departing from the spirit of the invention or from the scope of the appended claims.

What is claimed is:

1. A method for identifying machines causing process excursion comprising:
   processing a plurality of manufactured items through a series of processes on a plurality of machines;
   obtaining a set of data for each of said manufactured items;
   identifying problematic machines for each process wherein said manufactured items processed through said process on said machine have data indicating an excursion from a desired parameter value;
   for each problematic machine:
      computing a time delta between a first excursion and a last excursion;
      sorting in ascending order said time delta for each of said problematic machines;
      identifying a maximum delta slope based on differences between said time deltas; and
      setting a time cutting value at said maximum delta slope; and
   listing said problematic machines in order of most likely to be causing said process excursion wherein machines having a time delta higher than said time cutting value are eliminated from said listing of problematic machines.

2. The method according to claim 1 wherein said processing said plurality of manufactured items through said series of processes on said plurality of machines comprises processing a plurality of semiconductor wafers in a semiconductor manufacturing process flow.

3. The method according to claim 2 wherein said processing said plurality of semiconductor wafers comprises processing said plurality of semiconductor wafers grouped into lots of wafers and wherein said data indicates an excursion for a lot if all wafers in said lot indicate an excursion from a desired parameter value.

4. The method according to claim 1 further comprising eliminating from said listing of said problematic machines any of said machines associated with a process having more than one associated machine wherein data for said manufactured items for more than one associated machine for that process indicates an excursion.

5. The method according to claim 1 wherein if no maximum delta slope can be found, said time cutting value is set at a particular percentile of a first time delta.

6. The method according to claim 1 wherein said sorting in ascending order said time delta for each of said problematic machines comprises displaying said time deltas in a graphical representation and thereby identifying said maximum delta slope.

7. The method according to claim 1 for each problematic machine, further comprising:
   computing a good delta, the number of manufactured items having data indicating no excursion from a desired parameter value between a first excursion and a last excursion.

8. The method according to claim 1 for process steps having single machines, further comprising:
   sorting said problematic machines in ascending or descending order of said time delta for each of said problematic machines.

9. The method according to claim 7 further comprising:
   sorting in ascending order said good delta for each of said problematic machines;
   identifying a maximum delta slope based on differences between said good deltas; and
   setting a good cutting value at said maximum delta slope.

10. The method according to claim 9 wherein if no maximum delta slope can be found, said good cutting value is set at a particular percentile of a first good delta.

11. The method according to claim 9 wherein said sorting in ascending order said good delta for each of said problematic machines comprises displaying said good deltas in a graphical representation and thereby identifying said maximum delta slope.

12. The method according to claim 9 further comprising eliminating from said listing of said problematic machines any machine having a good delta higher than said good cutting value.

13. The method according to claim 12 for process steps having single machines, further comprising:
sorting said problematic machines in ascending or descending order of said good delta for each of said problematic machines.

14. The method according to claim 12 wherein said step of obtaining a set of data for each of said manufactured items is performed at final test or at any inline electrical testing, metrology measurement, or inspection at different process steps.

15. The method according to claim 1 for each problematic machine, further comprising:
computing a ratio of the number of manufactured items having data indicating an excursion from a desired parameter value versus the total number of manufactured items processed by said problematic machine for each said process.

16. The method according to claim 15 for process steps having multiple machines, further comprising:
sorting said problematic machines in ascending or descending order of said ratio for each of said problematic machines.

17. A manufacturing system, comprising:
a plurality of machines for processing a plurality of manufactured items through a series of processes;
means for obtaining a set of data for each of said manufactured items;
means for identifying manufactured items having an excursion from a desired process result; and
means for identifying and listing problematic machines in order of most likely to be causing said excursion wherein said means for identifying and listing problematic machines comprises:
for each problematic machine, computing a good delta, the number of manufactured items having data indicating no excursion from a desired parameter value between a first excursion and a last excursion;
sorting in ascending order said good delta for each of said problematic machines;
identifying a maximum delta slope based on differences between said good deltas; and
setting a good cutting value at said maximum delta slope; and farther comprising eliminating from said listing of said problematic machines any machine having a good delta higher than said good cutting value.

18. The manufacturing system according to claim 17 wherein said plurality of manufactured items comprises a plurality of semiconductor wafers.

19. The manufacturing system according to claim 18 wherein said plurality of semiconductor wafers comprises a plurality of semiconductor wafers grouped into lots of wafers and wherein an excursion is indicated for a lot if all wafers in said lot indicate an excursion from a desired parameter value.

20. The manufacturing system according to claim 17 wherein said means for obtaining a set of data for each of said manufactured items comprises final test or any inline electrical testing, metrology measurement, or inspection at different process steps.

21. The manufacturing system according to claim 17 wherein said means for identifying manufactured items having an excursion from a desired process result comprises comparing said data to said desired process result for each of said manufactured items at each process step on each machine.

22. The manufacturing system according to claim 17 wherein said means for identifying and listing problematic machines in order of most likely to be causing said excursion comprises identifying problematic machines for each process wherein said manufactured items processed through said process on said machine have data indicating an excursion from a desired parameter value.

23. The manufacturing system according to claim 17 wherein said means for identifying and listing problematic machines in order of most likely to be causing said excursion further comprises:
eliminating from said listing of said problematic machines any of said machines associated with a process having more than one associated machine wherein data for said manufactured items for more than one associated machine for that process indicates an excursion.

24. The manufacturing system according to claim 17 wherein said means for identifying and listing problematic machines in order of most likely to be causing said excursion further comprises:
for each problematic machine, computing a ratio of the number of manufactured items having data indicating an excursion from a desired parameter value versus the total number of manufactured items processed by said problematic machine for each said process; and
sorting said problematic machines in ascending or descending order of said ratio for each of said problematic machines.

25. The manufacturing system according to claim 17 wherein said means for identifying and listing problematic machines in order of most likely to be causing said excursion further comprises:
for process steps having single machines, sorting said problematic machines in ascending or descending order of said good delta for each of said problematic machines.

26. The manufacturing system according to claim 17 wherein said means for identifying and listing problematic machines in order of most likely to be causing said excursion further comprises:
for each problematic machine, computing a time delta between a first excursion and a last excursion;
sorting in ascending order said time delta for each of said problematic machines;
identifying a maximum delta slope based on differences between said time deltas;
setting a time cutting value at said maximum delta slope; and
eliminating from said listing of said problematic machines any machine having a time delta higher than said time cutting value.

27. The manufacturing system according to claim 26 wherein said means for identifying and listing problematic machines in order of most likely to be causing said excursion further comprises:

for process steps having single machines, sorting said problematic machines in ascending or descending order of said time delta for each of said problematic machines.

28. A manufacturing system, comprising:
a plurality of machines for processing a plurality of manufactured items through a series of processes;
a database server adapted to store a set of data associated with said manufactured items;
an excursion monitor adapted to identify manufactured items having an excursion from a desired process result; and
a problematic machine identifier for identifying and listing problematic machines in order of most likely to be causing said excursion wherein said identifying and listing said problematic machines comprises:
　for each problematic machine, computing a time delta between a first excursion and a last excursion;
　sorting in ascending order said time delta for each of said problematic machines;
　identifying a maximum delta slope based on differences between said time deltas; and
　setting a time cutting value at said maximum delta slope; and
　eliminating from said listing of said problematic machines any machine having a time delta higher than said time cutting value.

29. A method for processing a plurality of semiconductor wafers comprising:
providing a plurality of machines for processing said plurality of wafers;
processing said plurality of wafers through a series of processes using said plurality of machines wherein a database stores the time of processing of each of said plurality of wafers;
obtaining data for each of said plurality of wafers;
identifying problematic machines for each process wherein said semiconductor wafers processed through said process on said machine have data indicating an excursion from a desired parameter value
for each problematic machine:
　computing a good delta, the number of manufactured items having data indicating no excursion from a desired parameter value between a first excursion and a last excursion;
　sorting in ascending order said good delta for each of said problematic machines;
　identifying a maximum delta slope based on differences between said good deltas; and
　setting a good cutting value at said maximum delta slope; and
listing said problematic machines in order of most likely to be causing said process excursion wherein machines having a good delta higher than said good cutting value are eliminated from said listing of problematic machines.

* * * * *